Dec. 17, 1929.                    W. M. HOSTETTER                    1,740,401
                                  MIXING BOWL HOLDER
                                  Filed July 26, 1928
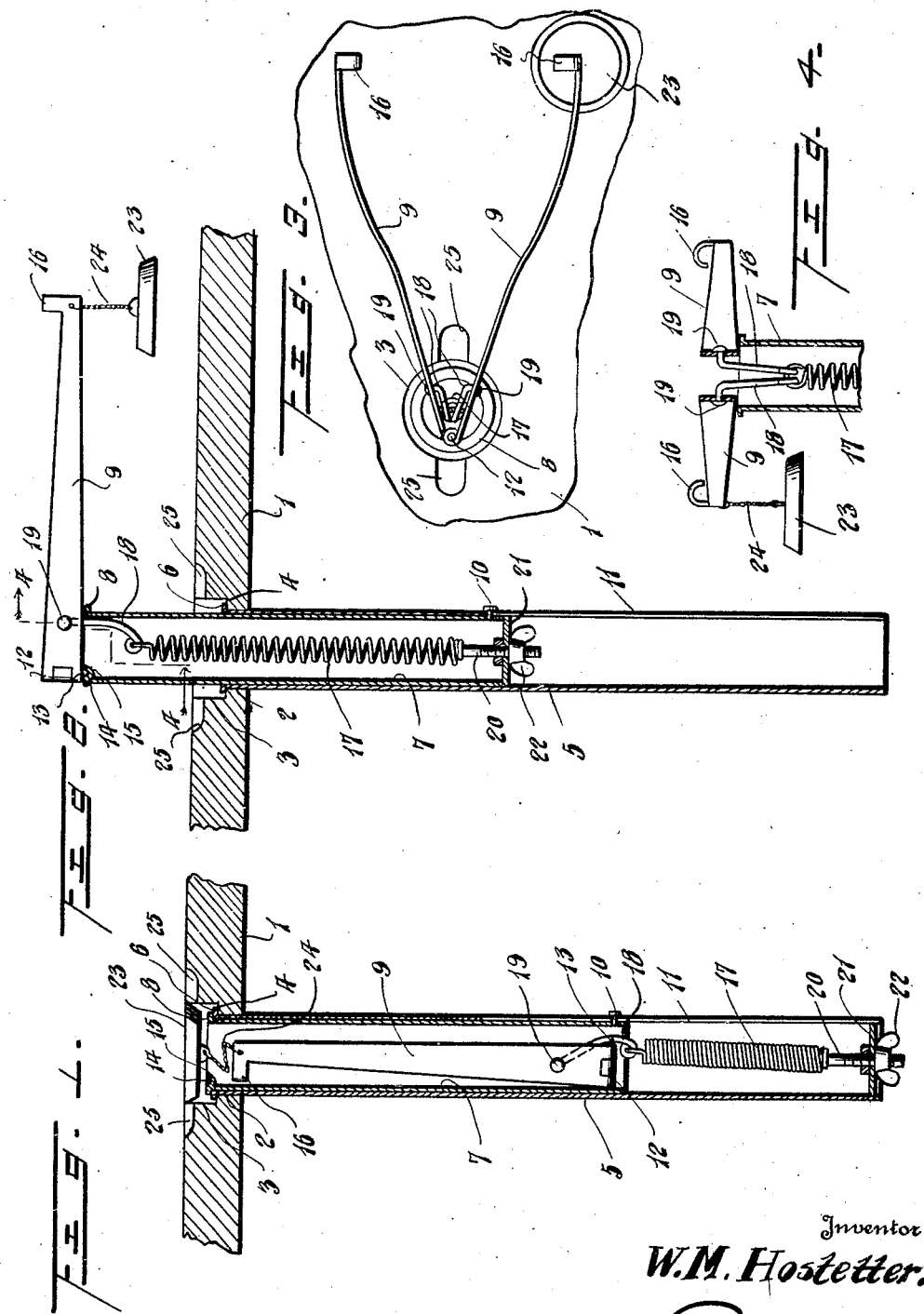
Inventor
W.M. Hostetter.
By [signature]
Attorney Patented Dec. 17, 1929

1,740,401

UNITED STATES PATENT OFFICE

WILLIS M. HOSTETTER, OF MIAMI, FLORIDA

MIXING-BOWL HOLDER

Application filed July 26, 1928. Serial No. 295,522.

The invention relates to a device for holding a mixing bowl on a table or other support, and is designed for use in kitchens or bakeries to hold a bowl for mixing cakes, pie dough or crust, and the like, and has for its principal object the provision of a device that is reasonable in cost of manufacture, and that is efficient in operation, and may be permanently installed in a table top, and when not in use is capable of being folded and stored out of the way.

A further object of the invention is the provision of a mixing bowl holder comprising a tubular member adopted to be secured in an opening in a kitchen table or other support and having a tubular standard telescopically engaged in said tubular member and clamping arms that are hingedly secured together and adapted to be folded and stored within the standard and tubular member, said arms being arranged to seat on the top of the standard and adjusted to fit the top edge of the bowl, being provided with hooks to engage over said top edge, and held in clamping relation therewith by means of a contractile coil spring connected with said arms and engaging a disk mounted in the tubular member and engaging against the bottom edge of the standard when the arms are in bowl engaging position, a cover disk being secured to one of the arms and adapted to close the opening in the table top when the arms are in collapsed position within the standard and tubular member.

The invention will be described in detail hereinafter and will be found illustrated in the accompanying drawings, in which Figure 1 is a central vertical sectional view of the mixing bowl holder showing the device in position when not in use, Figure 2 is a similar view showing the device in position for clamping a bowl, Figure 3 is a top plan view of the device, and Figure 4 is a sectional detail on a plane indicated by the line 4—4 of Figure 2.

In the drawings similar reference characters are used to designate corresponding parts throughout the several views.

The mixing bowl holder is shown applied to a conventional table top shown fragmentarily in Figures 1, 2, and 3 and designated 1, said top having an opening therethrough as shown at 2 with an offset portion 3 forming a shoulder 4 on which is seated or supported a tubular member 5 by means of an outwardly directed annular flange 6 engaging said shoulder 4. 7 indicates a tubular standard that is slidably mounted in the tubular member 5 and provided with an outwardly directed annular flange 8 that seats upon the flange 6 when the standard is in a lowered position as shown in Figure 1, and forms a support for the clamping arms 9 when the member is in position, as shown in Figure 2 to engage and hold a bowl on the table top 1. 10 indicates a stud or pin secured to the tubular standard 7 and slidably engaging in a longitudinal slot 11 in the tubular member 5.

Arms 9 are hingedly secured together as shown at 12, and the pintle of the hinge member is extended and formed with a tapered end 13 to engage in a tapered recess 14 in a lug 15 extending inwardly of the tubular standard 7, this construction providing for locating the hinged portions of the arms 9 and prevent transverse movement of the arms when in clamping position as shown in Figure 2. The free ends of the arms 9 are provided with upwardly and inwardly extended hooks 16 to engage over the edge of a mixing bowl. 17 indicates a contractile coil spring having one of its ends secured to links 18 that are connected as shown at 19 to the arms 9, while the other end of the spring 17 is secured to a threaded bolt 20 that is loosely passed through a disk 21 that is movably engaged in the tubular member 5, and when the device is in the position shown in Figure 2 engages against the lower end of the tubular standard 7 to stress the spring 17 and hold the arms 9 clamped in position on the bowl as heretofore described. The tension of the spring 17 may be regulated by the adjustment of the thumb nut 22 on the bolt 20. 23 indicates a cover disk to close the upper portion of the opening 2 in the table 1 when the device is in inoperative position as shown in Figure 1, said cover disk being connected to one of the arms 9 by means of a chain or other flexible member 24. 25 indicates recesses arranged on opposite sides of opening 2 in the top of the table top 1 to receive the finger and thumb or other means for engaging the cover disk to remove it from its position in the opening when it is desired to use the holder for the purpose stated.

It will be understood that in use when the cover disk 23 is raised from its position in the top of the opening 2 that the arms 9 will be pulled out of the standard 7, thereby raising the disk 21 into engagement with the lower edge of the standard and continued raising of the arms 9 will raise the standards until the stud 10 reaches the upper end of the slot 11. When the standard 7 reaches its highest position, the arms 9 will then be raised relatively to the standard against the tension of the spring 17 and are seated on top of the standard in the position shown in Figure 2 and may be adjusted relatively to one another to fit the bowl to be held, and furthermore that they may be raised against the tension of the spring 17 and moved on a fulcrum formed by the pointed end 13 of the hinge pintle in the socket 14 so that the hooks 16 will engage with the top edge of the bowl, it being understood that the adjustment of the device will be such that the arms 9 will be raised relatively to the top edge of the standard 7 sufficiently to have the spring 17 under tension when the edge of the bowl is engaged.

What is claimed is:—

1. A mixing bowl holder, comprising a tubular member, a tubular standard slidable in said member, arms hingedly connected and adapted to be supported on said standard and to be housed within the standard, and resilient means engaging said arms to hold them in engagement with a bowl.

2. In combination with a table top having an opening therein, a tubular member supported in said opening, a tubular standard slidably mounted in said tubular member, means to limit the movement of said standard in said member, clamping arms hingedly connected and adapted to be supported on said standard and to engage a bowl on the table top, and resilient means engaging said arms to hold them in clamping engagement with the bowl.

3. In combination with a table top having an opening therein, a tubular member secured in said opening, a tubular standard slidably mounted in said tubular member, means to limit the movement of said standard in said member, clamping arms hingedly connected and movably carried by said standard and adapted to be supported thereon and to engage a bowl on the table top, a disk slidably mounted in said tubular member and engageable with the standard, and a contractile spring connecting said disk and arms.

In testimony whereof I affix my signature.

WILLIS M. HOSTETTER.